(12) United States Patent
Dommety

(10) Patent No.: US 8,179,907 B2
(45) Date of Patent: May 15, 2012

(54) ROUTING DATA PACKETS IN A COMMUNICATION NETWORK

(75) Inventor: Gopal K. Dommety, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 12/105,038

(22) Filed: Apr. 17, 2008

(65) Prior Publication Data

US 2009/0201853 A1    Aug. 13, 2009

Related U.S. Application Data

(63) Continuation of application No. 10/198,892, filed on Jul. 18, 2002, now Pat. No. 7,362,768.

(51) Int. Cl.
*H04L 12/28*    (2006.01)

(52) U.S. Cl. ...... 370/401; 370/338; 370/352; 455/422.1

(58) Field of Classification Search .................. None
See application file for complete search history.

(56) References Cited

U.S. PATENT DOCUMENTS

| | | | | |
|---|---|---|---|---|
| 5,970,059 | A * | 10/1999 | Ahopelto et al. | 370/338 |
| 6,167,513 | A | 12/2000 | Inoue et al. | 713/150 |
| 6,223,035 | B1 | 4/2001 | Pierce et al. | 455/433 |
| 6,381,459 | B1 | 4/2002 | Gervens et al. | 455/445 |
| 6,385,454 | B1 | 5/2002 | Bahl et al. | 455/450 |
| 6,414,962 | B1 | 7/2002 | Hall et al. | 370/401 |
| 6,463,288 | B1 | 10/2002 | Havinis et al. | 455/456 |
| 6,496,505 | B2 | 12/2002 | La Porta et al. | 370/392 |
| 6,539,225 | B1 * | 3/2003 | Lee | 455/436 |
| 6,578,085 | B1 * | 6/2003 | Khalil et al. | 709/241 |
| 6,629,149 | B1 * | 9/2003 | Fraser et al. | 709/245 |
| 6,665,537 | B1 | 12/2003 | Lioy | 455/435 |
| 6,804,221 | B1 * | 10/2004 | Magret et al. | 370/338 |
| 6,915,325 | B1 * | 7/2005 | Lee et al. | 709/202 |
| 6,947,401 | B2 * | 9/2005 | El-Malki et al. | 370/331 |
| 6,992,994 | B2 * | 1/2006 | Das et al. | 370/328 |
| 7,031,279 | B2 | 4/2006 | Lee et al. | 370/331 |
| 7,050,416 | B2 | 5/2006 | Bichot et al. | 370/338 |
| 7,561,553 | B2 * | 7/2009 | Venkitaraman et al. | 370/338 |
| 2002/0025814 | A1 * | 2/2002 | Murai | 455/435 |
| 2002/0191597 | A1 * | 12/2002 | Lundstrom | 370/356 |
| 2003/0108014 | A1 * | 6/2003 | Newberg et al. | 370/338 |
| 2003/0161287 | A1 | 8/2003 | Venkitaraman et al. | 370/338 |

* cited by examiner

*Primary Examiner* — Duc C Ho
(74) *Attorney, Agent, or Firm* — Baker Botts L.L.P.

(57) ABSTRACT

Routing data packets includes receiving data packets from a network element at a routing gateway. The data packets are determined to be destined for a mobile node. A location of the mobile node is obtained. The data packets are forwarded to the mobile node according to the location on behalf of the network element.

24 Claims, 2 Drawing Sheets

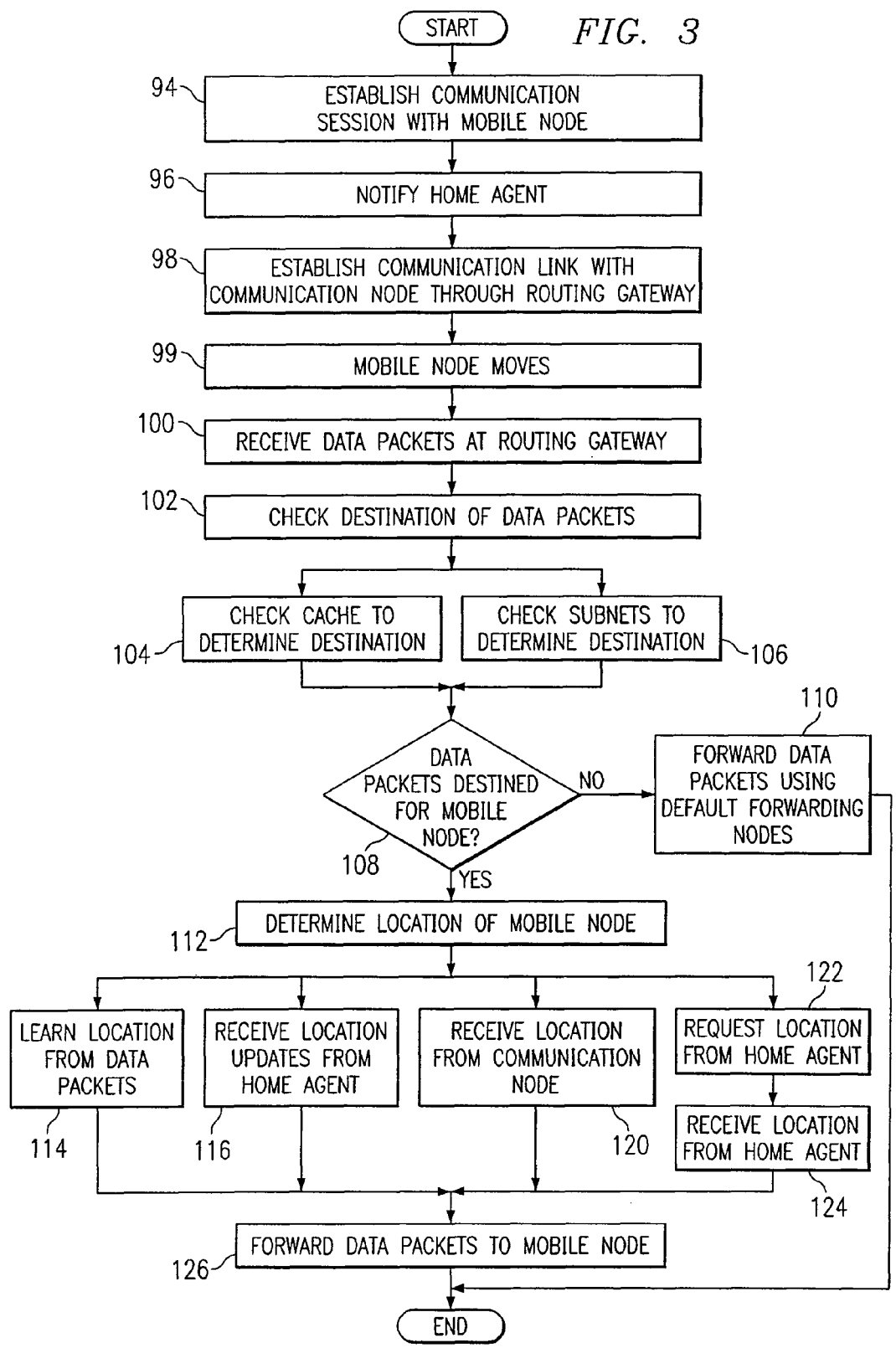

ROUTING DATA PACKETS IN A COMMUNICATION NETWORK

CROSS-REFERENCE TO RELATED APPLICATION

This application is a continuation of U.S. application Ser. No. 10/198,892 filed Jul. 18, 2002 and entitled "Routing Data Packets in a Communication Network."

TECHNICAL FIELD OF THE INVENTION

This invention relates in general to communication networks, and more particularly to routing data packets in a communication network.

BACKGROUND OF THE INVENTION

Routing data packets to a mobile node requires determining the location of the mobile node. A mobile node, however, may move from location to location. Consequently, routing data packets to mobile nodes has posed challenges.

SUMMARY OF THE INVENTION

In accordance with the present invention, the disadvantages and problems associated with routing data packets have been substantially reduced or eliminated. In particular, a system, method, and logic for routing data packets in a communication network are provided.

In accordance with one embodiment of the present invention, routing data packets includes receiving data packets from a network element at a routing gateway. The data packets are determined to be destined for a mobile node. A location of the mobile node is obtained. The data packets are forwarded to the mobile node according to the location on behalf of the network element.

Certain embodiments of the invention may provide one or more technical advantages. A technical advantage of one embodiment may be that a routing gateway performs forwarding functions, which may improve route optimization. For example, if a correspondent node and a mobile node are relatively close to each other, but a home agent is relatively far away, a nearby routing gateway, not the home agent, may be used to forward data packets between the correspondent node and the mobile node.

Another technical advantage of one embodiment may be that since the routing gateway performs forwarding functions, other network elements, such as a correspondent node or a home agent, need not perform the forwarding functions. For example, if a correspondent node does not need to forward data packets, the correspondent node does not need to track the location of the mobile node. Accordingly, the correspondent node is not required to have the capacity to determine or to store the location of the mobile node. Additionally, the location of the mobile node may be hidden from the correspondent node if desired.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its advantages, reference is now made to the following description, taken in conjunction with the accompanying drawings, in which:

FIG. 3 is a flowchart illustrating one embodiment of a method for routing data packets.

DETAILED DESCRIPTION OF THE INVENTION

Figure 1:
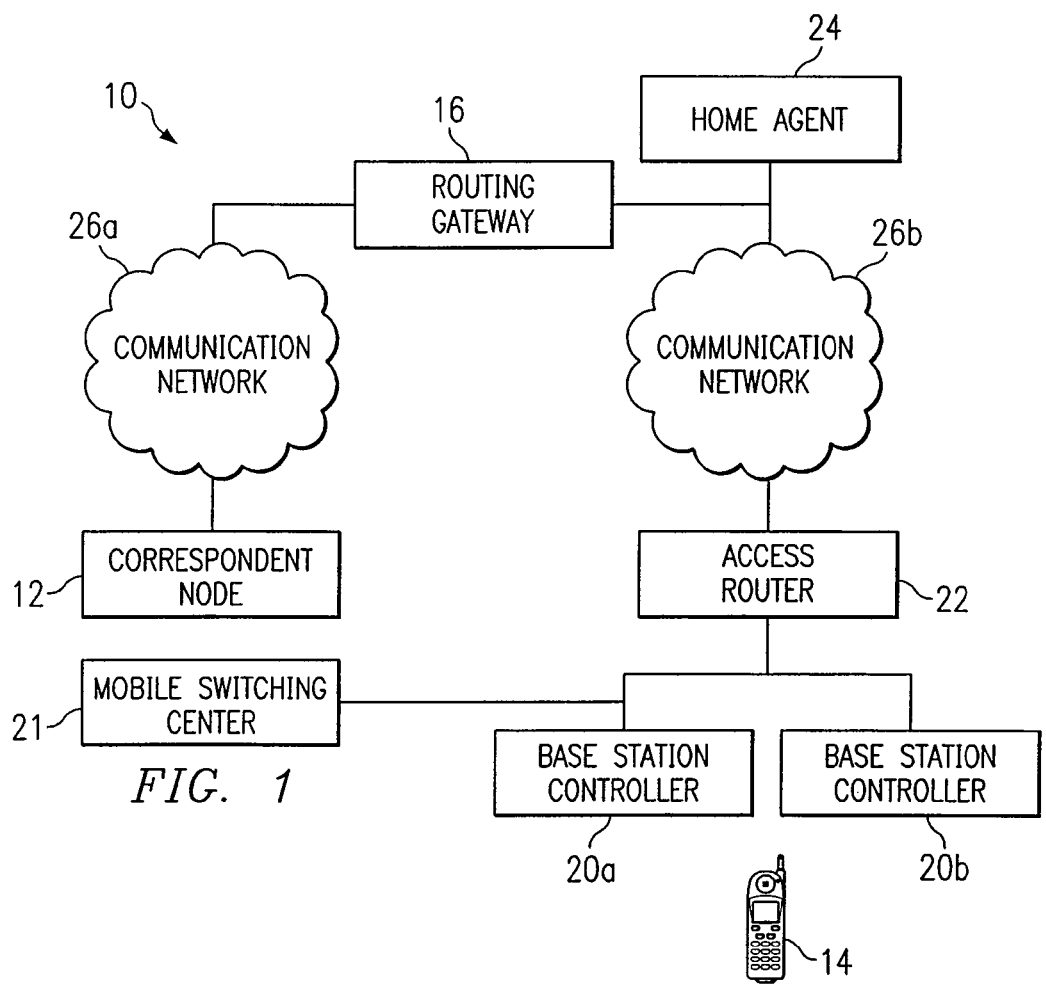
FIG. 1 illustrates one embodiment of a system for routing data packets between a correspondent node and a mobile node in a communication system.

FIG. 1 illustrates one embodiment of a system 10 for routing data packets between a correspondent node 12 and a mobile node 14 in a communication system. To route data packets, a routing gateway 16 determines that data packets are destined for mobile node 14, obtains the location of mobile node 14, and forwards the data packets to mobile node 14.

Mobile node 14 may include, for example, a personal digital assistant, a cellular telephone, a mobile handset, or any other device suitable for communicating data packets to system 10. Mobile node 14 may support, for example, simple Internet Protocol (IP), mobile IP, or any other suitable communication protocol. Mobile node 14 may utilize, for example, code-division multiple access (CDMA) technology or any other suitable mobile communication technology. A call from mobile node 14 may comprise data packets communicating information such as voice, data, video, multimedia, any other suitable type of information, or any combination of the preceding.

Correspondent node 12 may comprise any suitable node with which mobile node 14 may communicate or hold an interactive session, for example, a computer such as an email server, a messaging server, or a personal computer. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

System 10 may include base station controllers 20, a mobile switching center 21, an access router 22, a home agent 24, communication networks 26, and routing gateway 16. A base station controller 20 provides an interface between mobile node 14 and access router 22. Base station controller 20 may route a call from mobile node 14 through a base station. The wireless link between mobile node 14 and access router 22 is typically a radio frequency link that may be cellular in network organization.

Mobile switching center 21 manages base station controller 20, and may also manage communication between system 10 and portions of other systems that may be similar to system 10. Mobile switching center 21 may comprise, for example, a CISCO Mobile Switching Center. Mobile switching center 21 may include, for example, an open programmable switch such as a CISCO VCO/4K switch and a system controller program that provides call processing.

Access router 22 may establish a communication session, for example, a point-to-point session, with mobile node 14 in order to provide mobile node 14 with access to system 10. Access router 22 may comprise any suitable router that provides connectivity to a mobile device. Access router 22 may comprise, for example, a code division multiple access packet data serving node (CDMA-PDSN), a general packet radio service gateway serving node (GPRS-GSN), or a wireless local area network access zone router (WLAN-AZR). Home agent 24 records the location of mobile node 14 as mobile node moves from location to location. Home agent 24 may also provide mobile IP service to mobile node 14.

Communication networks 26 may comprise a public switched telephone network, a public or private data network, the Internet, a wired or wireless network, a local, regional, or global communication network, other suitable communication links, or any combination of the preceding.

Routing gateway 16 routes data packets between correspondent node 12 and mobile node 14. Routing gateway 16 receives data packets from correspondent node 12, determines that the data packets are destined for mobile node 14, determines the location of mobile node 14, and forwards the data packets to mobile node 14. Routing gateway 16 may be located at the edge of a communication network 26. The edge of a communication network 26 may comprise, for example, the edge of a long distance network, a local area network, a content service provider network, or a wireless network.

In the illustrated, example, routing gateway 16 performs route optimization on behalf of correspondent node 12. Accordingly, correspondent node 12 is not required to have the capacity to determine and store the location of mobile node 14. Additionally, the location of mobile node 14 may be kept hidden from correspondent node 12 if desired. According to another embodiment, routing gateway 16 performs forwarding functions, which may improve route optimization. For example, if correspondent node 12 and mobile node 14 are relatively close to each other, and home agent 24 is relatively far away, a nearby routing gateway 16 may be used to route data packets between correspondent node 12 and mobile node 14 without using home agent 24.

Figure 2:
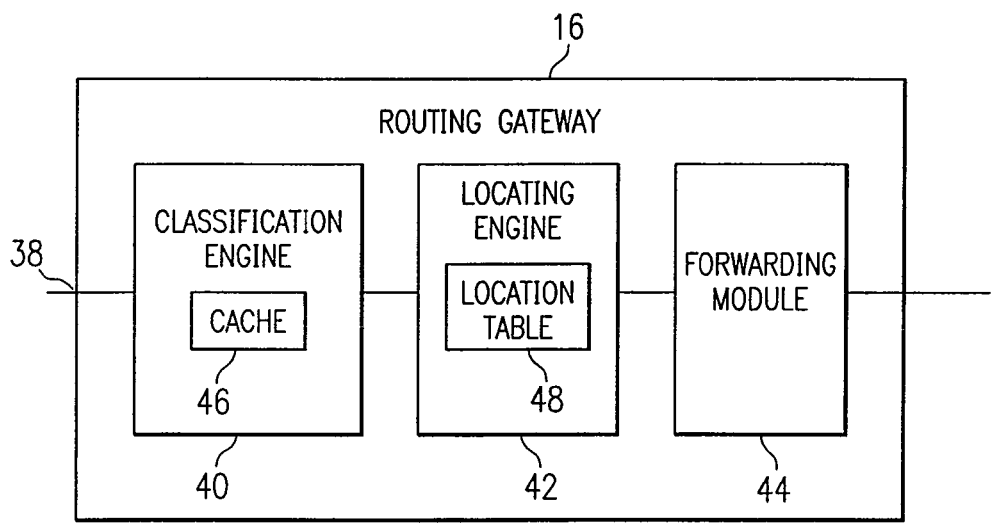
FIG. 2 illustrates one embodiment of routing gateway of the system of FIG. 1.

FIG. 2 illustrates one embodiment of routing gateway 16 of system 10. Routing gateway 16 receives data packets from correspondent node 12, determines that the data packets are destined for mobile node 14, determines the location of mobile node 14, and forwards the data packets to mobile node 14. Routing gateway 16 may include an input 38, a classification engine 40, a locating engine 42, and a forwarding module 44.

Input 38 receives data packets. Classification engine 40 determines whether the data packets are destined for mobile node 14. Classification engine 40 may include a cache 46 that stores information about mobile nodes 14 known by routing gateway 16. The information may include an identifier such as an address for mobile node 14. Classification engine 40 may check cache 46 in order to determine whether the data packets are destined for a mobile node 14 known by routing gateway 16.

Any other suitable procedure, however, may be used to check the destination of the data packets. For example, classification engine 40 may configure subnets for mobile nodes. Classification engine 40 may designate a subnet for mobile nodes. Data packets from a mobile node may be identified by having an address that includes a specific prefix.

Locating engine 42 checks the location of mobile node 14. Locating engine 42 may include a location table 48 that records the location of mobile node 14. Any other suitable method for determining the location of a mobile node 14 may be used. For example, locating engine 42 may check the data packets in order to learn the location of mobile node 14. A session initiation protocol (SIP) redirect packet, which includes a forwarding address for mobile node 14, may be checked. Alternatively, a binding update packet, which includes authentication instructions and a forwarding address, may be checked.

Alternatively, locating engine 42 may periodically receive updates regarding the location of mobile node 14 from home agent 24. Alternatively, locating engine 42 may receive information about the location from correspondent node 12. For example, correspondent node 12 may forward a binding update packet, which includes authentication instructions and a forwarding address, to locating engine 42. Alternatively, locating engine may request location information from home agent 24, and receive the information response to the request.

Forwarding module 44 forwards data packets to mobile node 14 at the location determined by locating engine 42. Forwarding module 44 may use any suitable method for forwarding the data packets to mobile node 14. For example, forwarding module 44 may encapsulate the data packets using IP in IP encapsulation or generic route encapsulation.

FIG. 3 is a flowchart illustrating one embodiment of a method for routing data packets. According to the method, routing gateway 16 determines that data packets are destined for mobile node 14, determines the location of mobile node 14, and forwards the data packets to mobile node 14.

The method begins at step 94, where access router 22 establishes a communication session with mobile node 14 in order to activate a call session. Mobile node 14 is registered with base station controller 26a and communicates data packets to base station controller 20a, which in turn communicates the data packets to access router 22 in order to establish a communication session. Mobile node 14 may also be authenticated at step 94.

Home agent 24 is notified of mobile node 14 at step 96. Mobile node 14 sends a request for mobile IP to access router 22, which transmits the request to home agent 24. In response, home agent 24 assigns an address to mobile node 14. Access router 22 receives the address within a mobile IP reply message, and forwards the address to mobile node 14 in a mobile IP registration reply message.

A communication link with correspondent node 12 is established through routing gateway 16 at step 98. Access router 22 receives data packets from mobile node 14 and processes the data packets according to mobile IP. The data packets are routed through home agent 24 and routing gateway 16 to correspondent node 12. Mobile node 14 moves at step 99 and requires a forwarding address.

Routing gateway 16 receives data packets from correspondent node 12 at step 100. Routing gateway 16 checks the destination of the data packets at step 102. Routing gateway 16 may use any suitable procedure for checking the destination of the data packets. Steps 104 and 106 describe example procedures. For example, classification engine 40 may check cache 46 that stores information about mobile nodes 14 known to routing gateway 16. Alternatively, classification engine 40 may check subnets that have been designated for mobile nodes.

The destination of the data packets indicates whether the data packets are destined for mobile node 14. If the data packets are not destined for mobile node 14 at step 108, the method proceeds to step 110 where the data packets are forwarded according to default forwarding rules. After forwarding the data packets, the method terminates.

If the data packets are destined for mobile node 14 at step 108, the method proceeds to step 112, where the location of mobile node 14 is determined. Locating engine 42 may use any suitable procedure for determining the location of mobile node 14. Steps 114 through 124 describe example procedures for determining the location of mobile node 14. For example, locating engine 42 may learn the location of mobile node 14 from the data packets at step 114. Data packets such as a session initiation protocol request packet or a binding update packet includes a forwarding address for mobile node 14. Locating engine 42 records this information in location table 48.

Alternatively, locating engine 42 may periodically receive updates regarding the location of mobile node 14 from home agent 24 at step 116. The information may be periodically stored in location table 48. Alternatively, locating engine 42 may receive the location of mobile node 14 from correspondent node 12 at step 120. Correspondent node 12 may send routing gateway 16 a binding update packet. Alternatively, locating engine 42 may request the location from home agent 24 at step 122. The location is received from home agent 24 at step 124.

After determining the location of mobile node 14, the method proceeds to step 126, where the data packets are forwarded to mobile node 14. Forwarding module 44 may forward the data packets to mobile node 14 without using correspondent node 14. After forwarding the data packets to mobile node 14, the method terminates.

In the illustrated example, routing gateway 16 performs forwarding functions on behalf of correspondent node 12. Routing gateway 16, however, may perform forwarding functions for any network element such as home agent 24.

Certain embodiments of the invention may provide one or more technical advantages. A technical advantage of one embodiment may be that a routing gateway performs forwarding functions, which may improve route optimization. For example, if a correspondent node and a mobile node are relatively close to each other, but a home agent is relatively far away, a nearby routing gateway, not the home agent, may be used to forward data packets between the correspondent node and the mobile node.

Another technical advantage of one embodiment may be that since the routing gateway performs forwarding functions, other network elements, such as a correspondent node or a home agent, need not perform the forwarding functions. For example, if a correspondent node does not need to forward data packets, the correspondent node does not need to track the location of the mobile node. Accordingly, the correspondent node is not required to have the capacity to determine or to store the location of the mobile node. Additionally, the location of the mobile node may be hidden from the correspondent node if desired.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method comprising:
receiving a plurality of data packets from a correspondent node through a first communication network at a routing gateway, the routing gateway located at an edge of the first communication network; and
routing the data packets, by the routing gateway, between the correspondent node and a mobile node, the correspondent node and the mobile node communicating in an interactive session, the routing comprising:
determining that the data packets are destined for the mobile node;
obtaining a location of the mobile node, the location including a forwarding address of the mobile node; and
forwarding the data packets by encapsulating the data packets at the routing gateway and sending the encapsulated data packets to the forwarding address of the mobile node through a second communication network for receipt by the mobile node without using a home agent of the mobile node to forward the data packets, the home agent of the mobile node operable to track the location of the mobile node and, at least when the home agent is not relatively far away from the mobile node, to forward data packets to the mobile node.

2. The method of claim 1, the determining that the data packets are destined for the mobile node comprising:
recording an identifier corresponding to the mobile node in a cache; and
finding the identifier in the cache to determine that the data packets are destined for the mobile node.

3. The method of claim 1, the determining that the data packets are destined for the mobile node comprising:
recording an identifier corresponding to the mobile node in a subnet designated for mobile nodes; and
finding the identifier in the subnet to determine that the data packets are destined for the mobile node.

4. The method of claim 1, the obtaining the location of the mobile node comprising:
receiving a location update at the routing gateway from the home agent; and
determining the location from the location update.

5. The method of claim 1, the obtaining the location of the mobile node comprising:
receiving the Session Initiation Protocol (SIP) request packet comprising the forwarding address; and
determining the location from the forwarding address.

6. The method of claim 1, the obtaining the location of the mobile node comprising:
receiving the binding update packet comprising a forwarding address; and
determining the location from the forwarding address.

7. The method of claim 1, the obtaining the location of the mobile node comprising:
requesting, by the routing gateway, the location of the mobile node from the home agent; and
receiving, at the routing gateway, the location of the mobile node from the home agent.

8. The method of claim 1, the routing the data packets between the correspondent node and the mobile node further comprising:
routing the data packets between the correspondent node and the mobile node through the routing gateway.

9. The method of claim 1, the routing the data packets between the correspondent node and the mobile node further comprising:
routing the data packets between the correspondent node and the mobile node independently of the home agent.

10. The method of claim 1, the correspondent node comprising an element selected from a set consisting of:
an email server;
a messaging server; and
a personal computer.

11. The method of claim 1, the obtaining a location of the mobile node comprising:
determining the location of the mobile node from a forwarding address of a Session Initiation Protocol (SIP) request packet.

12. The method of claim 1, the obtaining a location of the mobile node comprising:
receiving the location of the mobile node from the correspondent node in a binding update packet.

13. An apparatus comprising:
an input of a routing gateway configured to receive a plurality of data packets from a correspondent node through a first communication network, the routing gateway located at an edge of the first communication network; and one or more engines of the routing gateway configured to route the data packets between the correspondent node and a mobile node, the correspondent node and the mobile node communicating in an interactive session, the engines configured to route the data packets by:
  determining that the data packets are destined for the mobile node;
  obtaining a location of the mobile node, the location including a forwarding address of the mobile node; and
  forwarding the data packets by encapsulating the data packets at the routing gateway and sending the encapsulated data packets to the forwarding address of the mobile node through a second communication network for receipt by the mobile node without using a home agent of the mobile node to forward the data packets, the home agent of the mobile node operable to track the location of the mobile node and, at least when the home agent is not relatively far away from the mobile node, to forward data packets to the mobile node.

14. The apparatus of claim 13, the engines further configured to determine that the data packets are destined for the mobile node by:
  recording an identifier corresponding to the mobile node in a cache; and
  finding the identifier in the cache to determine that the data packets are destined for the mobile node.

15. The apparatus of claim 13, the engines further configured to determine that the data packets are destined for the mobile node by:
  recording an identifier corresponding to the mobile node in a subnet designated for mobile nodes; and
  finding the identifier in the subnet to determine that the data packets are destined for the mobile node.

16. The apparatus of claim 13, the engines further configured to obtain the location of the mobile node by:
  receiving a location update from the home agent; and
  determining the location from the location update.

17. The apparatus of claim 13, the engines further configured to obtain the location of the mobile node by:
  receiving the Session Initiation Protocol (SIP) request packet comprising the forwarding address; and
  determining the location from the forwarding address.

18. The apparatus of claim 13, the engines further configured to obtain the location of the mobile node by:
  receiving the binding update packet comprising a forwarding address; and
  determining the location from the forwarding address.

19. The apparatus of claim 13, the engines further configured to obtain the location of the mobile node by:
  requesting the location of the mobile node from the home agent; and
  receiving the location of the mobile node from the home agent.

20. The apparatus of claim 13, the engines further configured to route the data packets between the correspondent node and the mobile node by:
  routing the data packets between the correspondent node and the mobile node through the routing gateway.

21. The apparatus of claim 13, the engines further configured to route the data packets between the correspondent node and the mobile node by:
  routing the data packets between the correspondent node and the mobile node independently of the home agent.

22. The apparatus of claim 13, the correspondent node comprising an element selected from a set consisting of:
  an email server;
  a messaging server; and
  a personal computer.

23. The method of claim 1, the obtaining a location of the mobile node comprising:
  receiving, at the routing gateway, the location of the mobile node from the home agent in a binding update packet.

24. A method comprising:
  receiving a plurality of data packets from a correspondent node through a first communication network at a routing gateway, the routing gateway located at an edge of the first communication network; and
  routing the data packets, by the routing gateway, between the correspondent node and a mobile node, the correspondent node and the mobile node communicating in an interactive session, the routing comprising:
    determining that the data packets are destined for the mobile node;
    obtaining a location of the mobile node; and
    forwarding the data packets through a second communication network to the mobile node according to the location, the forwarding comprising:
      changing a path of the data packets from a path that includes a home agent of the mobile node to a path that does not include a home agent of the mobile node through encapsulating the data packets, the home agent of the mobile node operable to track the location of the mobile node and, at least when the home agent is not relatively far away from the mobile node, to forward data packets to the mobile node; and
      sending the data packets to the mobile node across the path that does not include the home agent of the mobile node.

* * * * *